Jan. 11, 1944.   P. B. DRANE   2,338,804
TIME CONTROLLED VALVE
Filed Oct. 31, 1942

Phillips B. Drane
INVENTOR
BY
ATTORNEY

Patented Jan. 11, 1944

2,338,804

UNITED STATES PATENT OFFICE 2,338,804

TIME CONTROLLED VALVE

Phillips B. Drane, Tulsa, Okla.

Application October 31, 1942, Serial No. 464,067

5 Claims. (Cl. 161—7)

The invention relates to time controlled valves and has for its object to provide a device of this kind wherein a clock having an alarm wind stem is carried by the valve casing and the valve is controlled by a spring actuated lever connected to the valve stem and to an off-center toggle formed from pivotally connected links and positioned adjacent the alarm winding stem whereby said off-centered toggle is broken on its central pivotal point thereby allowing the pivoted lever to close the valve under the influence of the contractible spring at a predetermined time.

A further object is to provide the lever, below its pivotal connection to the valve stem, with a link connection to the bracket carrying all of the mechanism, thereby insuring freedom of action and uniform axial movement of the valve stem.

A further object is to support all of the mechanism on the valve casing closure and to form said closure integral with the main bracket of the device.

A further object is to provide means whereby the alarm winding stem can be wound to maximum winding position and allowed to rotate a minimum distance, thereby obtaining the maximum power from the alarm spring for breaking the off-center toggle connection for the valve closing operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figures 1, 2:
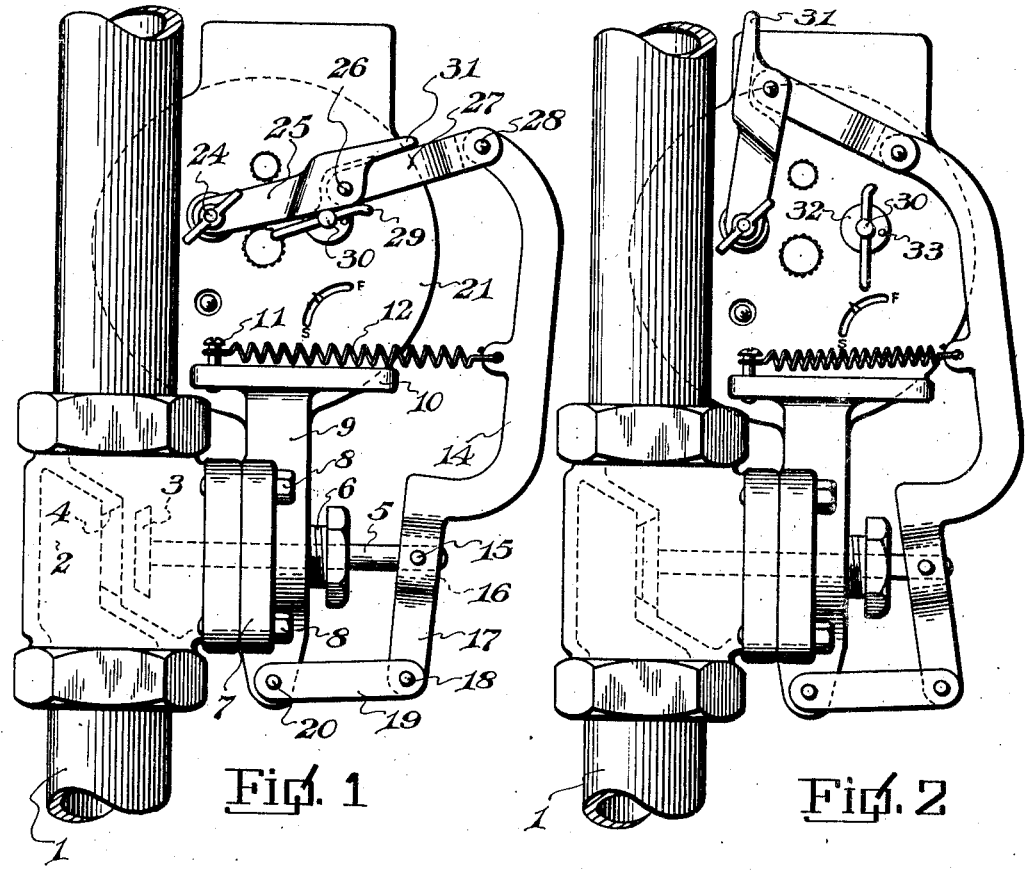
Figure 1 is a view in elevation of a pipe line having a valve therein and showing the device applied to the valve, and the parts set for a valve closing operation.
Figure 2 is a view similar to Figure 1, but showing the parts in operated position and the valve closed.
Figure 3:
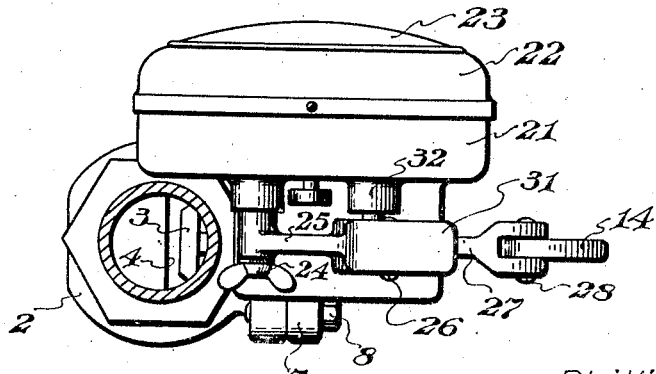
Figure 3 is a top plan view of the device.

Referring to the drawing, the numeral 1 designates a pipe line, 2 a valve casing carried by said line and 3 a valve which cooperates with a valve seat 4 for cutting off the passage of liquid through the pipe line. The valve 3 is provided with a valve stem 5, which extends through a packing bushing 6, and this packing bushing is preferably carried by the valve casing closure 7, which is bolted in place by means of bolts 8.

Formed integral with the closure 7 is an upwardly extending bracket 9 which terminates in a ledge 10, to which is anchored, at 11, a contractible spring 12. The outer end of the contractible spring is anchored at 13 to the valve operating lever 14 and which lever is forced inwardly by said spring for seating the valve 3.

The outer end of the valve stem 5 has a hinged connection 15 within the enlarged opening 16 in the downwardly extending arm 17 of the lever. The lower end of the arm 17 is hingedly connected at 18 to a link 19, and the link is in turn hingedly connected at 20 to the lower end of the bracket 9, therefore it will be seen that the valve stem 5 may freely move axially without side binding in its bearings.

The upper end of the bracket 9 terminates in a flanged housing 21, in which is disposed a conventional form of alarm clock 22 having its face 23 outwardly disposed. The alarm clock is provided with a winding stem 24 on which is pivotally mounted the link 25 of the off-center toggle connection. Pivotally connected at 26 to the link 25 is a second link 27, which is in turn hingedly connected at 28 to the upper end of the lever 14. It will be noted, referring to Figure 1, that the pivotal point 26, when the device is set, is below a straight line drawn between the points 24 and 28, hence is held in engagement with the arm 29 of the alarm winding shaft 30. Therefore, it will be seen that when the alarm is released at a predetermined time, the arm 29 will swing upwardly, forcing the pivotal point 26 to bisect a line drawn between the points 24 and 28, thereby allowing the contractible spring 12 to force the upper end of the lever 14 inwardly to the position shown in Figure 2, and to seat the valve 3. To reset the device the operator forces the finger engaging member 31 downwardly to the position shown in Figure 1, and in which position the finger engaging member engages the link 27 and forms a limit stop.

The alarm winding shaft 30 extends outwardly through a stationary boss 32, and the boss is provided with a removable pin 33. When the clock is placed in position the alarm is wound to its maximum position and then the pin 33 placed in position to limit the rotation of the alarm shaft to about one revolution therefore it will be seen that the maximum spring power is maintained for the valve tripping operation.

From the above it will be seen that a time controlled valve is provided, which is simple in construction, positive in its operation, and one wherein the entire mechanism may be applied to a conventional valve casing as a unit and without modifying the construction of the valve casing.

The invention having been set forth what is claimed as new and useful is:

1. The combination with a valve casing having a valve seat, a reciprocating valve cooperating with said seat, a valve stem carried by said valve and extending to the outside of the casing, of a time controlled mechanism for said valve, said time controlled mechanism comprising a bracket attached to said casing and through which the valve stem extends, a time controlled mechanism carried by said bracket, said mechanism having a rotatable time controlled shaft, arms carried by said shaft and rotatable therewith, a lever pivotally mounted on the valve stem and extending upwardly, an off-center toggle connection between the lever and a fixed point on the bracket and having its center adjacent the arm of the time controlled shaft whereby said off-center toggle is broken outwardly, a contractible spring anchored to the bracket and to the lever above the valve stem, a downwardly extending arm carried by the lever and a link connection between said arm and the bracket.

2. A device as set forth in claim 1 including a stop pin in the path of the arm carried by the time controlled shaft.

3. A device as set forth in claim 1 wherein the off-center toggle is formed from pivotally connected links, one of said links having a limit stop overlying the adjacent link.

4. The combination with a time controlled valve actuated by a pivoted lever, a time controlled mechanism, said mechanism having a time controlled rotatable shaft, an arm carried by said shaft and adapted to rotate at a predetermined time, of a through center double link toggle connection between the lever and a fixed point, a pivotal connection between said links adapted to assume a position whereby the links will engage the arm of the rotatable shaft on one side of a line between the pivoted ends of the toggle connection, said arm of the rotatable shaft forming means whereby said hinged connection will bisect said line upon rotation of the time controlled shaft and the arm carried thereby.

5. A device as set forth in claim 4 including stop means cooperating with the arm carried by the time controlled shaft for limiting the amount of rotation of said shaft.

PHILLIPS B. DRANE.